Patented Jan. 8, 1935

1,986,882

UNITED STATES PATENT OFFICE 1,986,882

HYDRATION OF OLEFINES

Henry Dreyfus, London, England

No Drawing. Application August 22, 1932, Serial No. 629,896. In Great Britain September 11, 1931

17 Claims. (Cl. 260—156)

This invention relates to the manufacture of aliphatic hydroxy compounds from olefines, and especially to the manufacture of aliphatic alcohols from olefines such as ethylene, propylene and the like.

According to the invention I have found that aliphatic hydroxy compounds may advantageously be produced by the hydration of olefines in the presence of basic substances, and especially in the presence of alkali metal hydroxides. In particular aliphatic alcohols may be prepared by the hydration of ethylene, propylene or other olefines in the presence of sodium or potassium hydroxide.

In the manufacture of aliphatic alcohols by the process of the invention it is preferable to avoid the use of high temperatures, for instance, of temperatures above about 300° or 350° C. since at such temperatures the yield of aliphatic alcohol may be seriously diminished by the occurrence of unwanted reactions, for example the formation of alkali salts of fatty acids. The exact temperature at which such reactions attain importance will, of course, depend on the other conditions employed such as for instance the pressure of the reactant gases or vapours or the proportions in which the reactants are present. Thus, for example, when very high pressures are employed it is advisable to work at a lower temperature than when lower pressures are used.

In general, temperatures between about 100° and 250° or 300° C. and especially between 150° and 250° C. may be employed. The process of the invention may be performed at atmospheric pressure, or even at pressures less than atmospheric, but it is preferable, especially when the reactants comprise gaseous or normally gaseous olefines, to employ pressures higher than atmospheric, for example up to 50 atmospheres or higher.

The yields and nature of the reaction products are further dependent on the proportions in which the reactants are present. Thus, for example, if the olefine is employed alone or with only small amounts of water, aliphatic alcohols in the form of alkali metal or other alcoholates may be obtained. Preferably, however, sufficient water is present in the reactant mixture to ensure that the alcohol is formed entirely in the free state. This is especially advantageous in that it permits the operation of the process in a continuous manner, since the basic substance employed remains as such in the reaction vessel and is not consumed or bound by combination to give a metallic alcoholate.

The hydration of olefines according to the invention may be performed in any convenient way. For instance, liquid olefines may be heated or boiled with sodium or potassium hydroxide, preferably in fairly concentrated aqueous solution. Atmospheric pressures or pressures higher than atmospheric may be employed. Or for instance olefines in the gas or vapour phase may be caused to react at normal or higher pressures with caustic alkali solution. In such cases, the process may be performed in a continuous manner; for instance the olefine may be absorbed in a continuously circulating alkali solution from which the alcohol is subsequently recovered in any convenient way, the solution being returned to the reaction zone. For example the olefine may conveniently be caused to flow in counter current to the alkali solution and under pressure. On releasing the pressure the alcohol contained in the alkali solution may be removed, and the solution returned under pressure to the reaction zone.

In another form of the invention the water required to produce free alcohol may be introduced partially or wholly with the olefine; for instance, a mixture of olefine in the gas or vapour phase with steam may be circulated over or in contact with alkali hydroxide or other basic substance, which may be in the solid form or in aqueous solution, or for instance deposited upon an inert carrier such as for example charcoal or pumice; the alcohol produced may be separated from the vapours leaving the reaction zone or collected as a liquid from the reaction zone, according to the pressure employed, and the said vapours may then be recirculated, if desired, with the addition of fresh water vapour.

The alcohol may be recovered from the reaction vapours in any convenient way, for example by fractional condensation of the vapours, or by condensation with the water vapour and subsequent separation, for instance by fractional distillation with or without an entraining liquid, or in any other convenient way. In such a case fresh water vapour is preferably added to the olefine before recirculation.

Although the invention has been described mainly with reference to the use of alkali metal hydroxides, it is not confined to these substances, but includes the use of other basic substances such as, for example, calcium oxide or magnesium oxide. Furthermore, these substances may be used in admixture with each other and/or with alkali metal hydroxides. Moreover, the basic substances of the present invention may, if desired, be employed in conjunction with other substances, especially with elements or compounds favouring the production of alcohols from olefines and steam, such as for example thoria, metals such as platinum, gold, silver, copper, tungsten, manganese etc. or compounds of these metals.

If desired, the alkali hydroxides or other basic substance to be used, alone or in conjunction with other substances, may be employed deposited upon, absorbed in or otherwise in association with inert supports or carriers, such as wood charcoal, silica gel, asbestos, pumice, etc.

The following examples illustrate the invention, and it is understood that the invention is in no wise limited thereto:—

Example 1

A mixture comprising equal volumes of ethylene and steam is led into 50% potassium hydroxide solution heated to 150° C. under a pressure of about 20 atmospheres until absorption is substantially complete. The alkali solution is then removed from the reaction zone, and the pressure released, the alcohol formed distils off, together with some water. The alkali solution is then returned to the reaction zone, and the process repeated.

Example 2

A mixture comprising one volume of ethylene to two volumes of steam at a pressure of 30 atmospheres is circulated over a catalyst mass comprising pumice impregnated with sodium hydroxide and heated to a temperature of 200° C. The vapours, either after each circuit or better after about each ten circuits of the apparatus, are cooled, and the mixture of ethyl alcohol and water is condensed. The ethyl alcohol is recovered by fractionation.

What I claim and desire to secure by Letters Patent is:—

1. Process which comprises the manufacture of aliphatic alcohols by hydration of the corresponding olefines at elevated temperatures in the presence of a strongly basic inorganic substance.

2. Process which comprises the manufacture of ethyl alcohol by hydration of ethylene at elevated temperatures in the presence of a strongly basic inorganic substance.

3. Process which comprises the manufacture of propyl alcohol by hydration of propylene at elevated temperatures in the presence of a strongly basic inorganic substance.

4. Process which comprises the manufacture of aliphatic alcohols by hydration of the corresponding olefines at a temperature between 100° and 300° C. in the presence of a strongly basic inorganic substance.

5. Process which comprises the manufacture of ethyl alcohol by hydration of ethylene at a temperature between 100° and 300° C. in the presence of a strongly basic inorganic substance.

6. Process which comprises the manufacture of aliphatic alcohols by hydration of the corresponding olefines at elevated temperatures in the presence of an alkali metal hydroxide.

7. Process which comprises the manufacture of ethyl alcohol by hydration of ethylene at elevated temperatures in the presence of an alkali metal hydroxide.

8. Process which comprises the manufacture of aliphatic alcohols by hydration of the corresponding olefines at elevated temperatures in the presence of an alkaline earth metal oxide.

9. Process which comprises the manufacture of ethyl alcohol by hydration of ethylene at elevated temperatures in the presence of an alkaline earth metal oxide.

10. Process which comprises the manufacture of aliphatic alcohols by hydration of the corresponding olefines at elevated temperatures in the presence of an alkaline earth metal hydroxide.

11. Process which comprises the manufacture of ethyl alcohol by hydration of ethylene at elevated temperatures in the presence of an alkaline earth metal hydroxide.

12. Process which comprises the manufacture of ethyl alcohol by hydration of ethylene at a temperature between 100° and 300° C. in the presence of an alkali metal hydroxide.

13. Process which comprises the manufacture of ethyl alcohol by hydration of ethylene at a temperature between 150° and 250° C. in the presence of an alkali metal hydroxide.

14. Process which comprises the manufacture of ethyl alcohol by hydration of ethylene at elevated temperatures and under a pressure up to 50 atmospheres in the presence of an alkali metal hydroxide.

15. Process which comprises the manufacture of ethyl alcohol by hydration of ethylene at elevated temperatures and under a pressure above atmospheric in the presence of an alkali metal hydroxide and thoria.

16. Process for the manufacture of ethyl alcohol which comprises bringing a mixture of ethylene with at least its own volume of water vapor into contact with an alkali metal hydroxide at a temperature between 100° and 300° C. under a pressure higher than atmospheric.

17. Process for the manufacture of ethyl alcohol which comprises bringing a mixture of ethylene with at least its own volume of water vapor into contact with an alkali metal hydroxide and with thoria, at a temperature between 100° and 300° C. under a pressure higher than atmospheric.

HENRY DREYFUS.